US006604858B2

United States Patent
Kusaka et al.

(10) Patent No.: US 6,604,858 B2
(45) Date of Patent: Aug. 12, 2003

(54) HYDRO DYNAMIC GAS BEARING AND DISK DRIVE USING THE SAME

(75) Inventors: Keigo Kusaka, Akashi (JP); Takafumi Asada, Hirakata (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/929,095

(22) Filed: Aug. 15, 2001

(65) Prior Publication Data

US 2002/0031286 A1 Mar. 14, 2002

(30) Foreign Application Priority Data

Aug. 31, 2000 (JP) ........................................ 2000-263404
Jun. 22, 2001 (JP) ........................................ 2001-188934

(51) Int. Cl.$^7$ ............................................. F16C 32/06
(52) U.S. Cl. ......................... 384/100; 384/113; 384/123
(58) Field of Search ................................ 384/100, 107, 384/112, 113, 123, 119, 132

(56) References Cited

U.S. PATENT DOCUMENTS

| 5,516,212 | A | * | 5/1996 | Titcomb | 384/107 |
| 5,658,080 | A | * | 8/1997 | Ichiyama | 384/112 |
| 5,777,403 | A | * | 7/1998 | Yuan | 384/100 |
| 6,097,121 | A | * | 8/2000 | Oku | 310/258 |
| 6,196,722 | B1 | * | 3/2001 | Asada et al. | 384/107 |

* cited by examiner

Primary Examiner—Christopher P. Schwartz
Assistant Examiner—Melanie Torres
(74) Attorney, Agent, or Firm—Parkhurst & Wendel, L.L.P.

(57) ABSTRACT

A hydro dynamic gas bearing having a sleeve with one end closed and connected to a front end of a shaft supported at its proximal end relative to a base on a fixed side, a plurality of hydro dynamic pressure generating grooves on at least one of an outer peripheral surface of the shaft and an inner peripheral surface of the sleeve opposite the outer peripheral surface, and a through hole communicating with the outside of the base extending from the front end to the proximal end of the shaft, the through hole having an air vent for adjusting pressure between the shaft and the sleeve for adjustment of discharge air so that the sleeve rotates in a contactless fashion relative to the shaft.

2 Claims, 5 Drawing Sheets

HYDRO DYNAMIC GAS BEARING AND DISK DRIVE USING THE SAME

FIELD OF THE INVENTION

The present invention relates to a hydro dynamic gas bearing and a disk drive using the bearing.

BACKGROUND OF THE INVENTION

In recent years, there is a tendency to increase speed and storage capacity of a recording/reproducing disc drive such as a magnetic disk, and particularly, achieving high-density recording is essential in increasing the storage capacity. To this end, highly accurate rotation technique of a main rotary shaft is required, and there is a move afoot to adopt a highly accurate hydro dynamic gas bearing in place of a conventional ball bearing or a cylindrical slide bearing.

FIGS. 4 and 5 show disk drives using a conventional hydro dynamic gas bearing.

In FIG. 4, a plurality of zigzag-shaped hydro dynamic pressure grooves 8 are formed on an outer peripheral surface of a shaft 9 to generate a hydro dynamic pressure subject to loads in radial and thrust directions. The shaft 9 is secured to a base 7 and inserted into a sleeve 10 so as to rotatably support the sleeve 10.

A circular coil 6 is provided on the base 7 by being inserted into a recess 10A formed in the sleeve 10. On an inner wall of the recess 10A, an annular magnet 5 is provided opposite the coil 6. Mounted to the sleeve 10 is a disk 14 which can magnetically or optically record/reproduce signals.

The bearing shown in FIG. 4 is accommodated in an inner space 13a defined by a casing 13 and the base 7 as shown in FIG. 5.

At the time of feeding a current through the coil 6, an electromagnetic force is generated between the magnet 5 and the coil 6 to rotate the sleeve 10 in a direction of arrow B. By this rotation, under a pumping action of the hydro dynamic pressure generating grooves 8 formed on the shaft 9, an air pressure in a sleeve inner space 11 between the shaft 9 and the sleeve 10 is locally increased to be higher than an outside air pressure. By the increased air pressure, the sleeve 10 is supported in a radial direction (direction of arrow R) of the shaft 9.

The hydro dynamic pressure generating grooves 8 are formed in an asymmetrical pattern with respect to radial-directional lines passing vertexes of each zigzag pattern. The pumping action thus caused generates an airflow which flows from a bottom to a top in the sleeve inner space 11 to increase an air pressure in a space 11A at a top of the shaft 9 to be higher than the outside air pressure. As a result, the sleeve 10 moves upward with respect to the shaft 9 in an axial direction (thrust direction) of the shaft.

A vent plate 1 of a cap 3 provided above the sleeve 10 has an air vent 2, so that the high-pressure air in the space 11A is discharged outward through the air vent 2. Setting a diameter of the air vent 2 to a predetermined value allows the air pressure to be kept at a constant value and allows an amount of upward movement of the sleeve 10 in the thrust direction to be kept at a predetermined value. In this way, the sleeve 10 is rotated in a contactless fashion with the shaft 9.

And, recording signals on the disk 14 or reading signals from the disk 14 is performed by means of a head 16 mounted to a head arm 17 which is driven to oscillate around an oscillation shaft 18 in a direction of arrow C by a voice coil motor 19 provided on the base 7.

In a disk device like this, at the time of inserting the shaft 9 into the sleeve 10, it is not seldom that foreign matters such as scrap metal powder of burr or wear powder generated at the time of metal processing sometimes enter the sleeve inner space 11. Further, at the time of rotating the sleeve 10, the sleeve 10 sometimes makes contact with the shaft 9 and others, causing the foreign matters to be generated.

These foreign matters 12 are conveyed to the space 11A at the top of the shaft 9 by the airflow which flows from the bottom to the top in the sleeve inner space 11. The foreign matters 12 having been conveyed to the space 11A are carried in the airflow which flows from the bottom to the top of the sleeve inner space 11 and discharged from the air vent 2 into an inner space 13a of a casing, and are driven to be discharged outside by passing through the air vent 2.

The foreign matters 12 thus discharged into the inner space 13a through the air vent 2 adhere to the surface of the disk 14 mounted to the sleeve 10, causing a problem of reduction in functional performance, such as a crush of the head 16 or a recording/reproducing error.

The present invention has an object to prevent the discharge of the foreign matters into the inner space 13a and to improve movement stability and reliability of the disk drive.

DISCLOSURE OF THE INVENTION

A hydro dynamic gas bearing according to claim 1 of the present invention is a hydro dynamic gas bearing, in which a sleeve with one end closed is connected to a front end of a shaft supported at its proximal end to a base on a fixed side, a plurality of hydro dynamic pressure generating grooves are formed on at least one of an outer peripheral surface of the shaft and an inner peripheral surface of the sleeve opposite the outer peripheral surface, and the sleeve is supported in a radial direction of the shaft by a pumping action of the hydro dynamic pressure generating grooves, the pumping action being made accompanying rotation of the sleeve, wherein the bearing comprises: a through hole formed to extend from the front end to the proximal end of the shaft and communicating with an outside of the base; and an air vent formed in the through hole and adjusting a pressure between the shaft and sleeve.

According to this configuration, by providing a hollow shaft having an air vent at its top, the rotation of the sleeve increases an air pressure in a sleeve inner space to be higher than an atmospheric air pressure, so that the sleeve is supported at a correct position in the radial direction of the hollow shaft. Fine foreign matters entering between the shaft and the sleeve at the time of assembly of the shaft and the sleeve or foreign matters generated as the sleeve contacts with the shaft and others at the time of rotation of the sleeve are carried in a gas passing through the air vent and guided to the outside of a casing through the through hole of the shaft. Therefore, it is possible to prevent the foreign matters from being discharged into an inner space of the casing and improve reliability of the bearing.

A disk drive according to claim 2 of the present invention is a disk drive comprising a hydro dynamic gas bearing and a casing accommodating therein the bearing, wherein the hydro dynamic gas bearing is configured such that a sleeve with one end closed is connected to a front end of a shaft supported at its proximal end to a base on a fixed side, a plurality of hydro dynamic pressure generating grooves are formed on at least one of an outer peripheral surface of the shaft and an inner peripheral surface of the sleeve opposite the outer peripheral surface, and the sleeve is supported in a radial direction of the shaft by a pumping action of the hydro dynamic pressure generating grooves, the pumping action being made accompanying rotation of the sleeve, and wherein the casing, part of which is formed by the base, includes in an inner space thereof: a recording medium mounted to the sleeve; driving mechanisms for rotatably driving the sleeve with respect to the shaft; and a head making access to the recording medium to execute reading and writing of information, the inner space of the casing being communicated with an atmospheric outside through a through hole of the shaft.

DESCRIPTION OF THE EMBODIMENT

Embodiments of the present invention will be described below in detail with reference to FIGS. 1 to 3.

Figure 4:
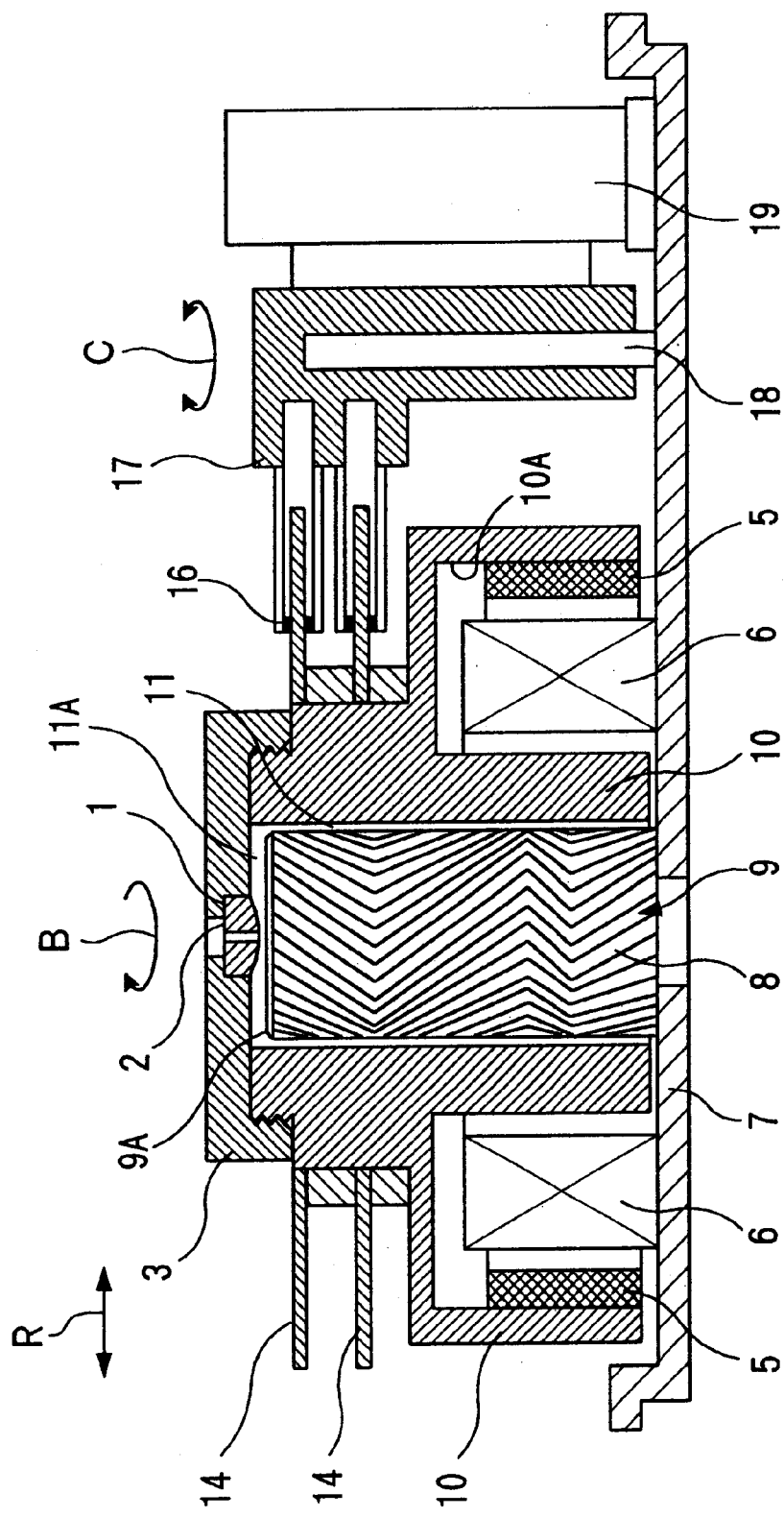
FIG. 4 is a vertical sectional view of an essential part of a disk drive using a conventional hydro dynamic gas bearing.
Figure 5:
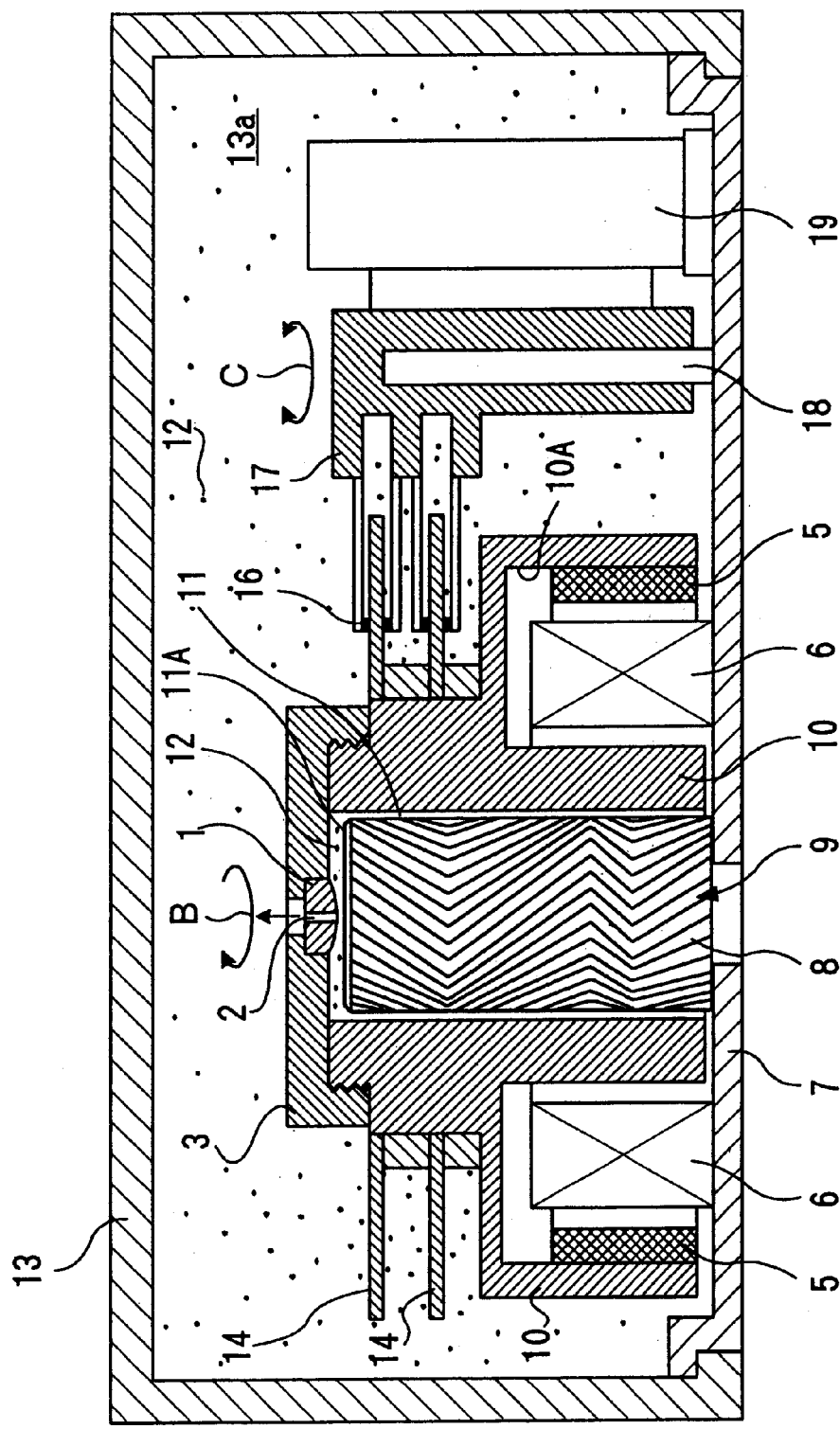
FIG. 5 is a vertical sectional view of the conventional disk drive in a completed stated.

In the description, components having the same effects as the components in FIGS. 4 and 5 showing a conventional example will be labeled with the same reference numerals.

Figure 1:
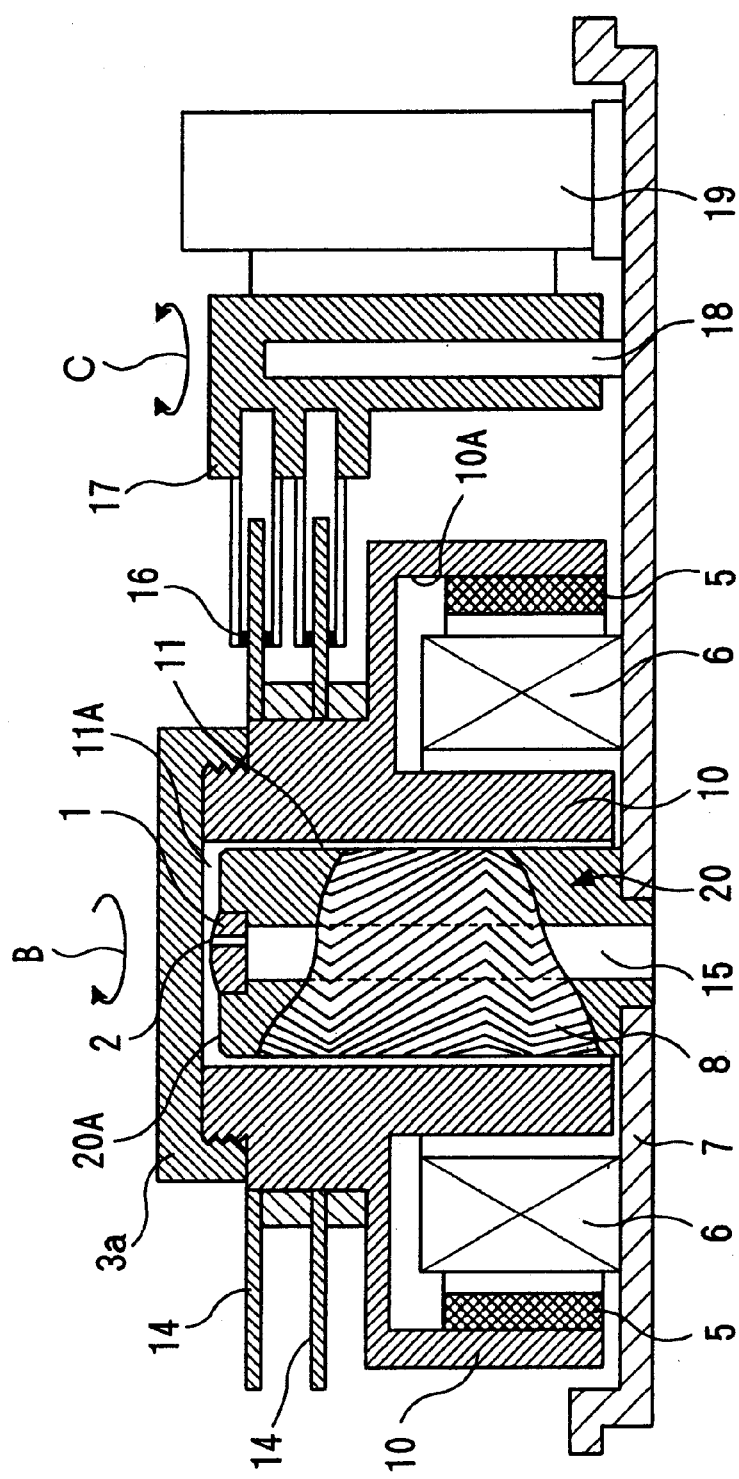
FIG. 1 is a vertical sectional view of an essential part of a disk drive using a hydro dynamic gas bearing according to an embodiment of the present invention.

FIG. 1 is a vertical sectional view of an essential part of a disk drive using a hydro dynamic gas bearing according to the present invention.

There is a difference between a conventional disk drive and the disk drive according to this embodiment in that a shaft 9 for supporting a sleeve 10 in the former is a solid shaft having no through hole formed therein, whereas the shaft for supporting the sleeve 10 in the latter is a hollow shaft 20 formed with a through hole 15 extending from a front end to a proximal end thereof.

In the conventional disk drive, a vent plate 1 is provided on a cap 3 on the sleeve 10 side, while in this embodiment, the vent plate 1 is provided on the hollow shaft 20 side.

The hollow shaft 20 is formed, on its outer peripheral surface, with a plurality of known hydro dynamic pressure generating grooves 8 which generates a hydro dynamic pressure for receiving radial and thrust loads.

The sleeve 10 with one end closed by the cap 3 is placed to cover the outside of the hollow shaft 20 and is rotatably supported. The sleeve 10 is formed, at its lower portion, with an annular recess 10A opening downward, which is mounted with a magnet 5.

At the front end of the hollow shaft 20, the vent plate 1 having an air vent 2 is mounted so as to partly block the through hole 15. The air vent 2 is formed by drilling a portion apart from a center of the through hole 15 formed along the axis of the hollow shaft 20.

The hydro dynamic gas bearing has a coil 6 and the magnet 5 which constitute driving mechanisms for rotatably driving the sleeve 10 with respect to the hollow shaft 20, and at the time of feeding a current through the coil 6 provided on the base 7 side, a torque is produced on the sleeve 10 by a known electromagnetic action caused to generate by the coil 6 and magnet 5 to rotate the sleeve 10.

By this rotation, a known pumping action of the hydro dynamic pressure generating grooves 8 increases an air pressure in a sleeve inner space 11 between the outer peripheral surface of the hollow shaft 20 and an inner peripheral surface of the sleeve 10 to be higher than an outside air pressure so as to support the sleeve 10 at a correct position in a radial direction (direction of arrow R) of the hollow shaft 20. The pumping action also increases an air pressure in a space between a top surface 20A of the hollow shaft 20 and a cap 3a, so that the sleeve 10 moves upward with respect to the hollow shaft 20. By setting a diameter of the air vent 2 to a predetermined value, which air vent is formed in the disk-shaped vent plate 1 secured to the top of the hollow shaft 20 concentrically, and adjusting an amount of air discharged outward from the air vent 2 through the through hole 15 of the hollow shaft 20 to keep the inside air pressure constant, the sleeve 10 can be held at a desired position in an axial direction (thrust direction) of the hollow shaft 20. In this way, the sleeve 10 is rotated in a contactless fashion with the hollow shaft 20.

Figure 2:
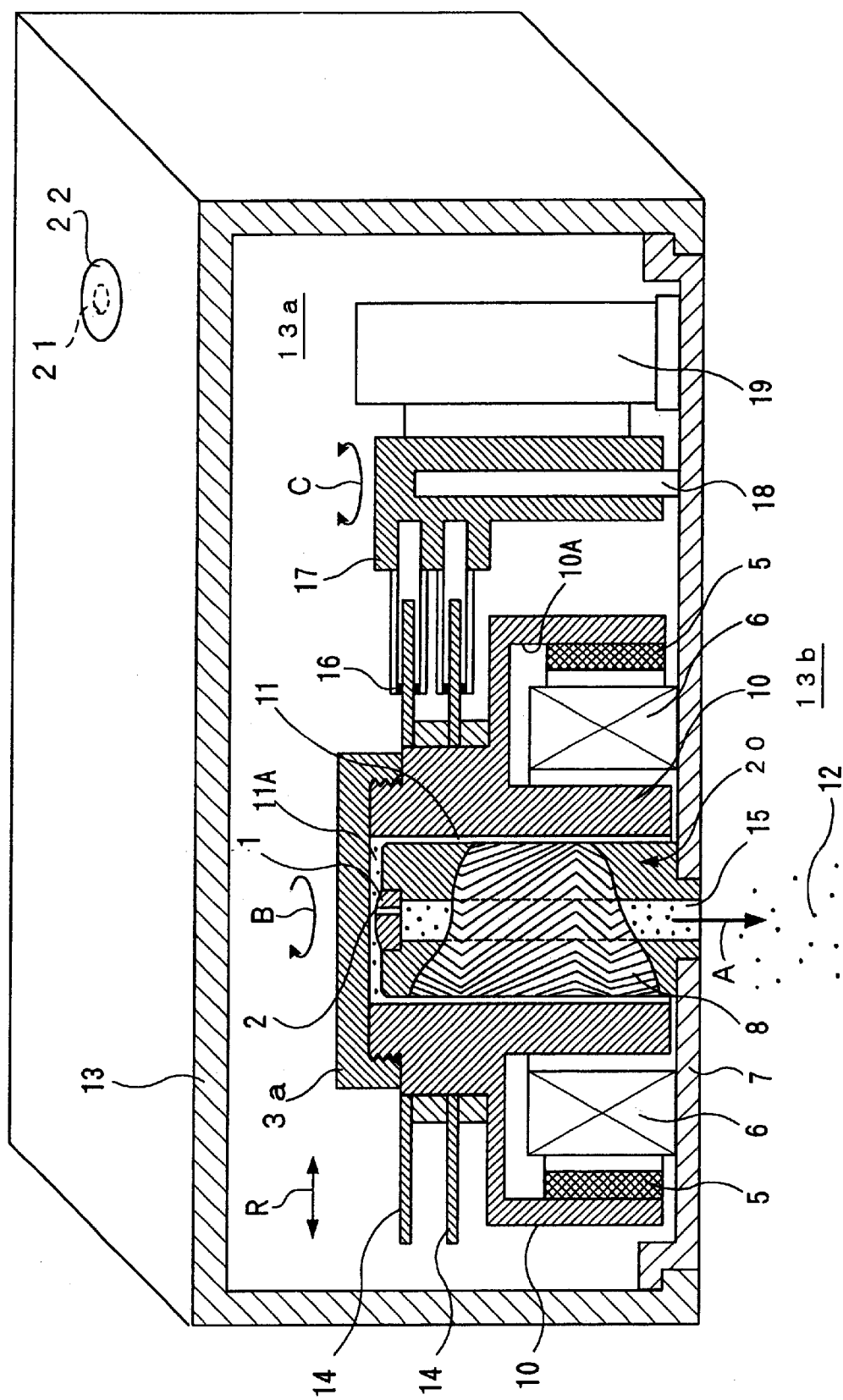
FIG. 2 is a vertical sectional view of the disk drive in a completed state according to the embodiment.

In the disk drive using the hydro dynamic gas bearing thus configured, a disk 14 which can magnetically or optically record/reproduce signals is mounted to the sleeve 10, and the disk drive shown in FIG. 1 is accommodated in an inner space 13a formed by a casing 13 and the base 7 as shown in FIG. 2. Reference numeral 21 denotes an air inlet which is formed on part of the casing 13 and covered with a filter 22 for preventing entry of foreign matters and permitting passage of air.

For recording or reproducing signals with respect to the rotating disk 14, the signals are recorded on the disk 14 or the signals recorded on the disk 14 are read by a head 16 mounted to a head arm 17 which oscillates around an oscillation shaft 18 in a direction of arrow C by a voice coil motor 19.

At the time of assembly, that is to insert the hollow shaft 20 into the sleeve 10, the foreign matters such as metal powder generated at the time of processing of these components often enter the sleeve inner space 11. The foreign matters are often generated in the sleeve inner space 11 as the sleeve contacts with the shaft and others at the time of rotation of the sleeve 10, but in this embodiment, influence of the foreign matters can be eliminated by the following mechanisms.

In this embodiment, as the shaft for supporting the sleeve 10 as described above, the hollow shaft 20 is adopted which is formed with the through hole 15 extending from the front end to the proximal end thereof, so that the foreign matters 12 having entered into the sleeve inner space 11 by the rotation of the sleeve 10 are not discharged into the inner space 13a defined by the casing 13 and the base 7, but are carried in an airflow moving from the air vent 2 to the through hole 15 of the hollow shaft 20 and discharged into the outside 13b as shown by arrow A.

Accordingly, the foreign matters 12 do not adhere to the surface of the disk 14, causing no reduction in functional performance of the drive, such as a crush of the head 16 or a recording/reproducing error, so that improvement can be achieved to movement stability and reliability of the disk drive.

Figure 3A:
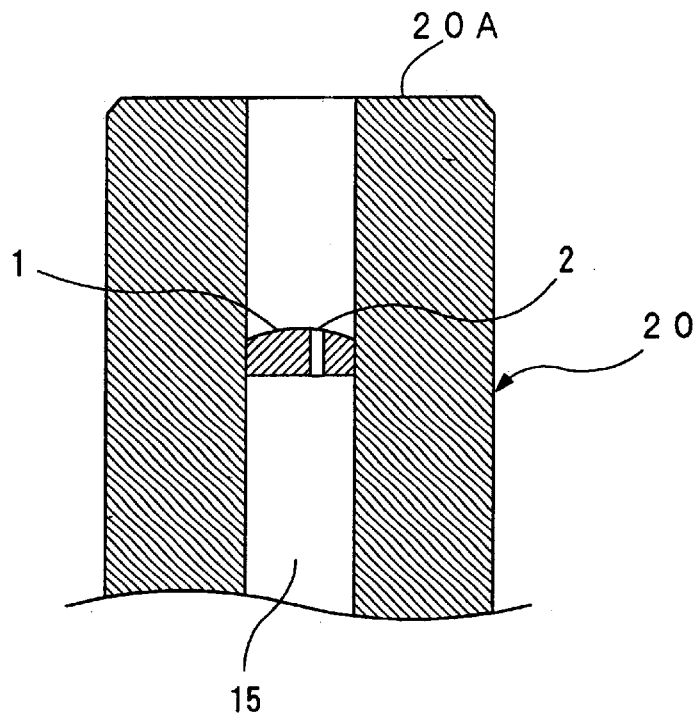
FIG. 3 is a vertical sectional view of a hollow shaft of a disk drive according to another embodiment.
Figure 3B:
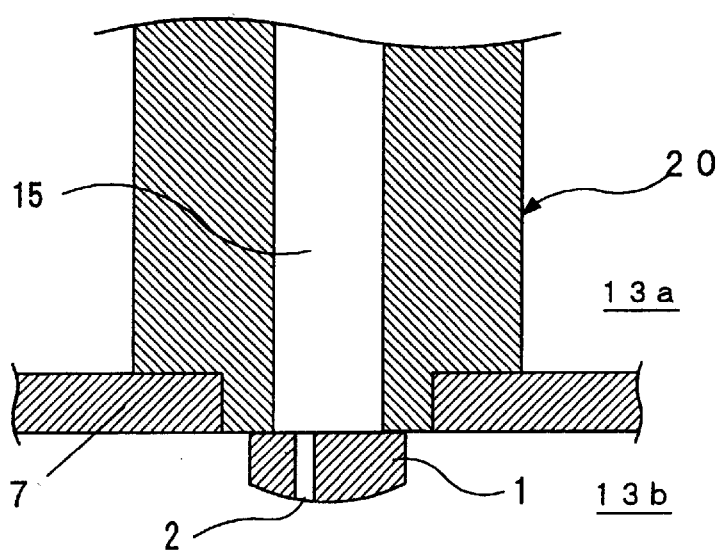

In the above described embodiment, the vent plate 1 formed with the air vent 2 is provided at the front end of the hollow shaft 20, but the vent plate 1 may be provided midway in the through hole 15 of the hollow shaft 20 as shown in FIG. 3A, or at the proximal end of the hollow shaft 20 so as to partly block the through hole 15 as shown in FIG. 3B.

In the above described embodiment, the hydro dynamic pressure generating grooves 8 are formed on the outer peripheral surface of the hollow shaft 20, but the hydro dynamic pressure generating grooves 8 may be formed on the inner surface the sleeve 10 opposite the outer peripheral surface of the hollow shaft 20, or may be formed on each of the surfaces.

As described above, in the hydro dynamic gas bearing according to the present invention, by providing the hollow shaft for supporting the sleeve which has the air vent at its top, the rotation of the sleeve increases the air pressure in the sleeve inner space to be higher than the outside air pressure so as to support the sleeve at a correct position in the radial direction of the hollow shaft. And, the fine foreign matters entering between the shaft and sleeve at the time of assembly of the shaft and sleeve, or the foreign matters generated as the sleeve contacts with the shaft and others at the time of rotation of the sleeve are carried in a gas passing through the air vent and guided to the outside of the casing through the through hole of the shaft, and discharged from the through hole. Thus, the foreign matters are well prevented from being discharge into the inner space of the casing.

Further, in the disk drive according to the present invention, the fine foreign matters entering between the shaft and the sleeve at the time of assembly of the shaft and sleeve, or the foreign matters generated as the sleeve contacts with the shaft and others at the time of rotation of the sleeve are carried in the gas passing through the air vent and guided to the outside of the casing through the through hole of the shaft, so that the foreign matters can be prevented from adhering to the recording medium mounted to the sleeve within the casing. Thus, improvement to movement stability and reliability of the disk drive can be expected.

What is claimed is:

1. A hydro dynamic gas bearing comprising:
   a shaft having a front end and a proximal end, the shaft supported at the proximal end by a base having an outside surface, a sleeve with one end closed and rotatably connected to the front end of the shaft, a plurality of hydro dynamic pressure generating grooves located in at least one of an outer peripheral surface of the shaft and an inner peripheral surface of the sleeve opposite the outer peripheral surface of the shaft, wherein the sleeve is supported in a radial direction of the shaft by a pumping action of fluid in the hydro dynamic pressure generating grooves upon rotation of the sleeve, and the bearing additionally comprises:
   a through hole extending from the front end to the proximal end of the shaft and communicating with the outside surface of the base; and
   an air vent connected to the through hole for adjusting a pressure between the shaft and the sleeve.

2. A disk drive comprising a hydro dynamic gas bearing and a casing accommodating therein the bearing, wherein
   the hydro dynamic gas bearing comprises a shaft having a front end and a proximal end, the shaft supported at the proximal end by a base having an outside surface, a sleeve with one end closed and rotatably connected to the front end of the shaft, a plurality of hydro dynamic pressure generating grooves located in at least one of an outer peripheral surface of the shaft and an inner peripheral surface of the sleeve opposite the outer peripheral surface, wherein the sleeve is supported in a radial direction of the shaft by a pumping action of fluid in the hydro dynamic pressure generating grooves upon rotation of the sleeve, and
   the casing, part of which is formed by the base, comprises in an inner space thereof containing:
   a recording medium mounted to the sleeve;
   driving mechanism for rotatably driving the sleeve with respect to the shaft;
   a head for accessing a recording medium to execute reading and writing of information,
   the inner space of the casing communicating with an exterior atmosphere via a through hole in the shaft; and
   an air vent connected to the through hole for adjusting a pressure between the shaft and the sleeve.

* * * * *